United States Patent
Rao et al.

[19]

[11] Patent Number: 6,165,385
[45] Date of Patent: Dec. 26, 2000

[54] BLUE EMITTING CE³⁺ ACTIVATED BORATE PHOSPHORS USED IN FLUORESCENT LAMPS AND TV TUBES AND A PROCESS FOR SYNTHESIZING THE SAME

[75] Inventors: Gundlapalli Venkata Subba Rao; Ramakrishnan Sankar, both of Karaikudi, India

[73] Assignee: Council of Scientific and Industrial Research, New Delhi, India

[21] Appl. No.: 09/273,487

[22] Filed: Mar. 22, 1999

[30] Foreign Application Priority Data

Jan. 12, 1999 [IN] India ................... 52/DEL/99

[51] Int. Cl.⁷ ........................... C09K 11/63; C09K 11/55; C09K 11/62; C09K 11/64; C09K 11/80

[52] U.S. Cl. ........................................ 252/301.4 R
[58] Field of Search ...................... 252/301.4 R

[56] References Cited

U.S. PATENT DOCUMENTS 4,810,416   3/1989   Hase et al. ............. 252/301.4 R

*Primary Examiner*—C. Melissa Koslow
*Attorney, Agent, or Firm*—Greenblum & Bernstein, P.L.C.

[57] ABSTRACT

The present invention relates to novel blue emitting $Ce^{3+}$ activated borate phosphors which are used in fluorescent having lamps and TV tubes, having the formula $A_6M_{1-x}Ce_xM'(BO_3)_6$ wherein A=La,Sr; M=La,Y, Gd, Lu; and M=Mg, Al, Ga, and x ranging from 0.001–1, and a process for the synthesis of the said activated borate phosphors.

8 Claims, 3 Drawing Sheets

BLUE EMITTING CE³⁺ ACTIVATED BORATE PHOSPHORS USED IN FLUORESCENT LAMPS AND TV TUBES AND A PROCESS FOR SYNTHESIZING THE SAME

FIELD OF THE INVENTION

The present invention relates to new blue emitting $Ce^{3+}$ activated borate phosphors and a process for the synthesis of said phosphors for use in fluorescent lamps and TV tubes. More particularly, the invention relates to new blue emitting $Ce^{3+}$ activated borate phosphors having the formula $A_6M_{1-x}Ce_xM'(BO_3)_6$ wherein A=La,Sr; M=La, Y, Gd, Lu; and M'=Mg, Al, Ga, and x ranging from 0.001–1 and a process for the synthesis of said phosphors.

BACKGROUND

Phosphors for fluorescent lamps [low pressure mercury vapour (lpmv) lamps, excited by mercury discharge at low pressure corresponding to radiation of wavelength 254 nm] range from the conventional halophosphates $[Ca_5(PO_4)_3F:Sb^{3+}, Mn^{2+}$; with a color rendering index (CRI)~70 and an efficacy 65 lm/W], to tricolor blend of rare earth phosphors (with an improved CRI of 90 and an efficacy ~85 lm/W). The CRI of halophosphates can be increased without altering the lumen output by adding a blue emitter (broad band) to it, which covers the whole of the blue region. The phosphor $Ca_5(PO_4)_3F:Sb$ (emission maximum at 480 nm) satisfies this requirement. In the case of high efficiency tricolor (trichromatic) fluorescent lamps based on rare-earth phosphors, where a blend of three different inorganic compounds each emitting in different regions viz., blue (450 nm), green (540 nm) and red (610 nm) mixes upon to give out white light, when excited by mercury discharge at low pressure corresponding to radiation of wavelength 254 nm, further improvement of CRI is not a serious requirement. Still higher value of CRI (95) is achieved in the case of super-deluxe lamps (efficacy only 65 lm/W). This is possible by having a blend of a broad band emitting red with a broad band emitting blue as well as a line emitting green. The phosphor $Sr_4Al_{14}O_{25}:Eu^{2+}$ (emission maximum at 490 nm) and $Sr_2P_2O_7:Eu^{2+}$ (emission maximum at 420 nm) act as blue components in deluxe lamps. In general, narrow band (or line) emitters help to increase the efficacy while broad band emitters increase the CRI in lpmv lamps. The requirements of all these components for use in lpmv lamps are mainly strong emission in the required regions when excited with 254 nm wavelength and thus strong absorption of 254 nm radiation. In addition, it must be easily synthesizeable and must be stable [the inorganic dopant(s) present in the phosphor should not undergo any change in its valence state when heated to high temperatures $\geq 600°$ C., one of the essential conditions required during the process of lamp manufacturing (baking), and the phosphor should not degrade at ordinary and at high temperatures ($\geq 900°$ C.) and on continuous irradiation by light of wavelength 254 nm]. Hitherto, the blue components have been either calcium tungstate ($CaWO_4$, emission at 420 nm) or calcium halophosphate ($Ca_5(PO_4)_3F$) doped with antimony ($Sb^{3+}$) in the case of conventional halophosphate system, or barium magnesium aluminate ($BaMgAl_{10}O_{17}$) and strontium chloroapatite ($Sr_5(PO_4)_3Cl$) doped with divalent europium ($Eu^{2+}$) in the tricolor phosphor blend, or strontium aluminate ($Sr_2Al_6O_{11}$) and strontium pyrophosphate ($Sr_2P_2O_7$) doped with divalent europium ($Eu^+$) in deluxe lamps. Eventhough, these phosphors emit in the required region with high intensity, the phosphates and aluminates require very high temperatures ($\geq 1200°$ C. for phosphates and $\geq 1500°$ C. for aluminates) for their synthesis. In addition, they require a strong reducing atmosphere ($N_2:H_2$ or $H_2$ gas flow) to reduce $Eu^{3+}$ to $Eu^{2+}$, at that temperatures.

In the case of cathode-ray phosphors used in conventional televisions (CTV), the phosphor $ZnS:Ag^+$ is the blue component. Here, the phosphor needs to get excited with long wavelength UV (355 nm) which is compatible with the cathode-ray excitation. For the beam-index phosphor used in television tubes, a short decay time is necessary to avoid afterglow or persistence. The life time of an electron in the excited state of $Ce^{3+}$ ion, when doped in any inorganic crystal lattice is very short. Hence, the $Ce^{3+}$ ion-doped lattices are preferred to avoid afterglow. Eventhough the silicate phosphors $Y_2Si_2O_7:Ce^{3+}$ (emission maximum at 375 nm) and $Y_2SiO_5:Ce^{3+}$ (emitting in the blue region) are known as beam-index phosphors, the silicate phosphors not only require very high temperatures for their synthesis but also require repeated firing at high temperatures with several intermittent grindings.

OBJECTS OF THE INVENTION

The main object of the present invention is to provide new blue emitting $Ce^{3+}$ activated borate phosphors. Another object of the invention is to provide a process for the synthesis of new blue emitting $Ce^{3+}$ activated borate phosphors for use in fluorescent lamps and TV tubes, obviating the drawbacks as detailed above. These borate phosphors can be synthesized easily at lower temperatures than those required for the synthesis of the existing aforementioned commercial blue phosphors and can be excited with radiation of wavelength 254 and 355 nm. In addition, these compounds emit a broad band (blue region) with very high intensity under both excitations.

The above objectives may be accomplished, by using new borate phosphors of the formula $Sr_6M_{1-x}Ce_xM'(BO_3)_6$ where M=La, Gd, Lu and M'=Ga; $La_{1-x}Ce_xSr_5YMg(BO_3)_6$ where $0.001 \leq x \leq 1$ in both; and $Sr_6Y_{1-x}Ce_xAl(BO_3)_6$ where $0.001 \leq x \leq 0.3$, with a Rhombohedral-hexagonal structure. In these compounds, so far no attempts have been made to study the $Ce^{3+}$ luminescence properties. In addition, when x=1 in the above series of compounds, it results in the new borate phosphors $Sr_6CeGa(BO_3)_6$ and $CeSr_5YMg(BO_3)_6$.

DETAILED DESCRIPTION OF THE INVENTION

Figure 1:
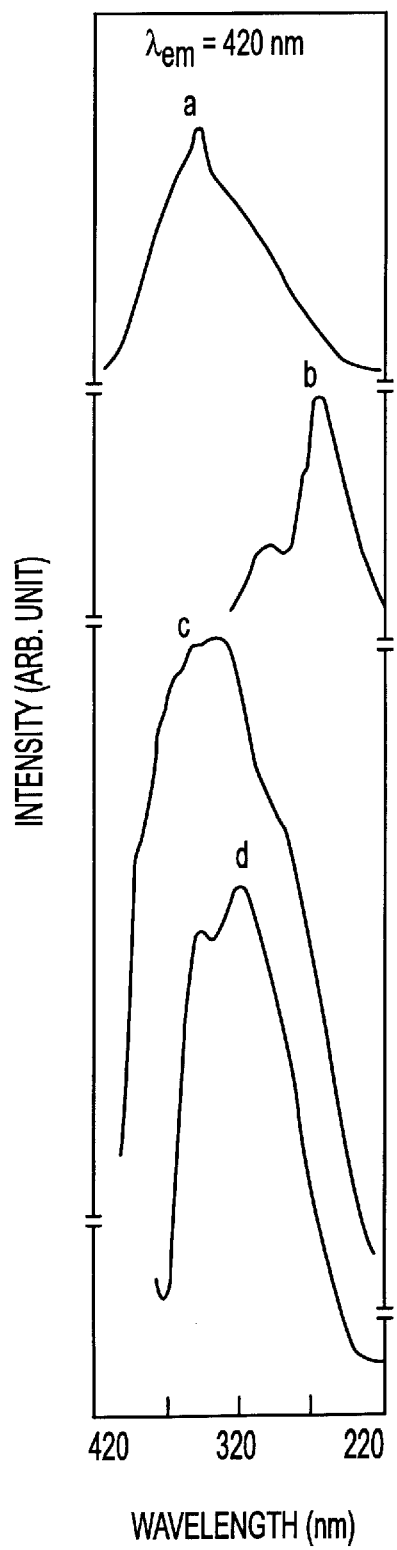

Accordingly, the present invention provides new blue emitting $Ce^{3+}$ activated borate phosphors having the formula $A_6M_{1-x}Ce_xM'(BO_3)_6$ wherein A=La, Sr; M=La, Y, Gd, Lu; and M'=Mg, Al, Ga, and x ranging from 0.001–1 and a process for the synthesis of said phosphors by the solid state reaction using at least four of the ingredients from the group consisting of $SrCO_3$ (5.5–6.5 mole), $La_2O_3$ or $Gd_2O_3$ or $Lu_2O_3$ (0.0001–0.6 mole), MgO (0.85–1.1 mole), $Ga_2O_3$ (0.45–0.55 mole), $Y_2O_3$ (0.4–0.55 mole), $Al_2O_3$ (0.35–0.55 mole) [or $Al(NO_3)_3.9H_2O$], $CeO_2$ (0.001–1.1 mole) and $H_3BO_3$ (5.5–7.0 mole) comprising the following steps: (i) mixing and grinding of the ingredients selected in suitable proportions, for about 15–45 minutes in an agate mortar with acetone, (ii) subjecting the ground ingredients to a pre-firing in air at temperatures ranging from 150–300° C. for a period of time ranging from 2–10 hr. and (iii) subjecting the pre-heated powders obtained from step (ii) to a final heat treatment under reducing atmosphere at temperatures ranging from 750–1050° C. for a period ranging from 6–30 hours, to obtain the desired phosphors useful as blue components in low pressure mercury vapour lamps, deluxe lamps and in television tubes, when excited with UV radiation of wavelengths 254 and 355 nm.

In an embodiment of the invention, the synthesis of the borate phosphors is carried out under reducing atmosphere created by either activated charcoal or $H_2$ gas flow.

According to a feature of the invention, the synthesized borate phosphors have particle size in the range of 5–15 $\mu$m.

According to the another feature of the invention, the synthesized borate phosphors show intense blue emission in the region $\lambda$=400–420 nm.

According to yet another feature of the invention, the synthesized borate phosphors are directly excited with radiation of wavelengths at 254 nm and 355 nm.

According to the present invention, new borate phosphors have been synthesized by solid state reaction using the ingredients $SrCO_3$, $Ln_2O_3$ (Ln=La, Y, Gd, Lu), $M_2O_3$ (M=Al, Ga), MgO, $CeO_2$ and $H_3BO_3$ at about 750–1050° C. under reducing atmosphere. Since the dopant cerium was required to yield the necessary luminescence by undergoing excitation-emission processes, it has been added as oxide along with the other raw materials. In an experiment, $SrCO_3$ was mixed with $H_3BO_3$, $La_2O_3$, $Ga_2O_3$ and $CeO_2$ in an agate mortar, ground thoroughly with acetone and allowed to dry in air. The mixture was then kept inside an alumina crucible (~20 ml capacity) and pre-fired in air at 150–300° C. for 5–10 hrs. It was ground and kept in the same crucible over which ashless filter paper was placed so as to cover the sample fully. This crucible was then placed inside a big alumina crucible (75–100 ml capacity) containing 20–30 gm of activated charcoal at the bottom to create a nonoxidizing atmosphere in the crucible. The big crucible was then covered with a lid and placed inside a muffle furnace. The furnace was then set to reach 750–1050° C. and kept for 5–30 hours. The sample was cooled inside the furnace/ quenched in air to room temperature. The final product obtained is a white powder. The experiments were repeated separately with $H_2$ gas flow as the non-oxidizing/reducing medium instead of activated charcoal. The results obtained showed that, the average particle size of these powders was found to be in the range of 3–28 $\mu$m. The phase purity of these compounds was confirmed from powder X-ray data.

BRIEF DESCRIPTION OF THE ACCOMPANYING DRAWINGS

FIG. 1. Gives a comparative excitation spectra of standard commercial phosphors alongwith the borate phosphors of the present invention ($\lambda_{em}$=420 nm).

a=ZnS:Ag; b=CaWO$_4$; c=Sr$_2$P$_2$O$_7$:Eu$^{2+}$; d=Sr$_6$(LaCe)Ga (BO$_3$)$_6$ [FIG. 1(a–c) represent the excitation band of commercial phosphors whereas band (d) represents the phosphors of the present invention.

Figure 2:
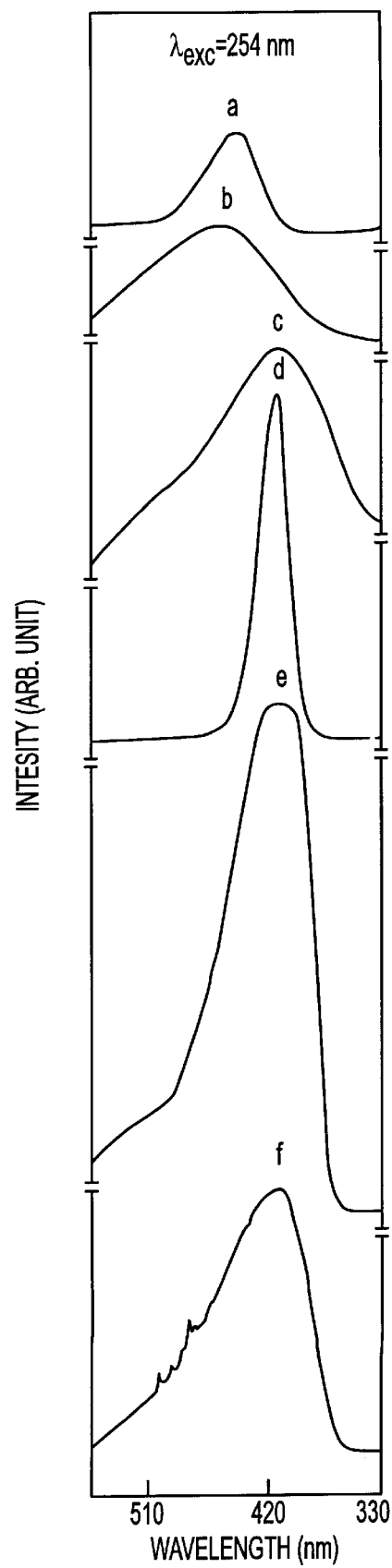

FIG. 2. Represents the emission spectra of various compounds, wherein a=ZnS:Ag; b=Ca$_5$(PO$_4$)$_3$F:Sb$^{3+}$; c=CaWO$_4$; d=Sr$_2$P$_2$O$_7$:Eu$^{2+}$;

e=Sr$_6$CeGa(BO$_3$)$_6$ and f=Sr$_6$La$_{0.99}$Ce$_{0.01}$Ga(BO$_3$)$_6$ and wherein a–d represent the excitation bands of commercial phosphors whereas e–f represent the phosphors of the present invention ($\lambda_{exc}$=254 nm).

Figure 3:
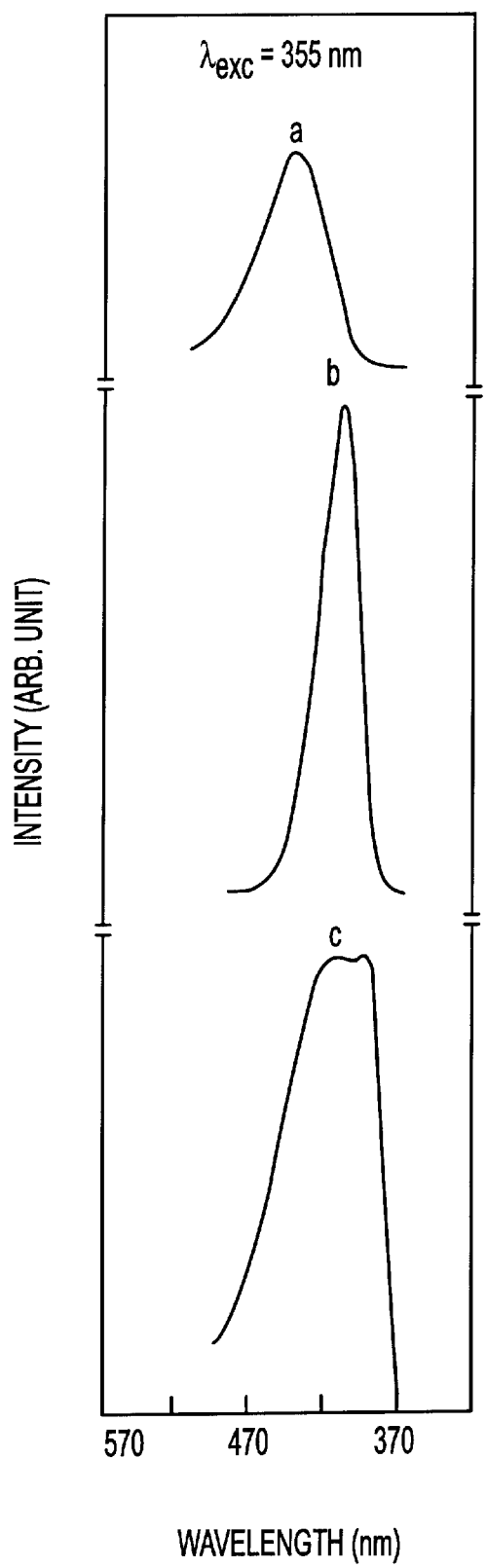

FIG. 3. Represents the emission spectra of various compounds ($\lambda_{exe}$=355 nm).

a=ZnS:Ag; b=Sr$_2$P$_2$O$_7$:Eu$^{2+}$; c=Sr$_6$CeGa(BO$_3$)$_6$

As shown in the drawings accompanying this specification, the excitation spectra of various compounds are given along with the borate phosphors present invention for comparison. In the said FIG. 1, a=ZnS:Ag; b=CaWO$_4$; c=Sr$_2$P$_2$O$_7$:Eu$^{2+}$; d=Sr$_6$(LaCe)Ga(BO$_3$)$_6$) When scanned for excitation by keeping the emission maximum ($\lambda_{em}$) at 420 nm, the excitation band is found to be a broad band (220–375 nm) with a peak extending from 316–330 nm and a side band at 355 nm, as shown in FIG. 1d of the drawings accompanying this specification for a particular composition I which corresponds to Sr$_6$CeGa(BO$_3$)$_6$ (M=Ce; M=Ga; and x=1.0). The excitation bands of other standard commercial phosphors are shown (FIG. 1(a, b, c) of the drawings accompanying this specification) for comparison. Hence, it is clear that these borate phosphors can be excited efficiently with radiation of wavelength 254 as well as 355 nm. In FIG. 2 of the drawings accompanying this specification, (a=ZnS:Ag; b=Ca$_5$(PO$_4$)$_3$F:Sb$^{3+}$; c=CaWO$_4$; d=Sr$_2$P$_2$O$_7$:Eu$^{2+}$; e=Sr$_6$CeGa(BO$_3$)$_6$ and f=Sr$_6$La$_{0.99}$Ce$_{0.01}$Ga(BO$_3$)$_6$ the emission spectra of various compounds ($\lambda_{exc}$=254 nm) are given along with the borate phosphors of the present invention for comparison. When excited with radiation of wavelength 254 nm ($\lambda_{exc}$), these materials are found to emit a broad band (340–480 nm) with a peak in the range 410–420 nm for high Ce$^{3+}$ concentrations and in the range 400–408 nm for low Ce$^{3+}$ concentrations as shown in FIG. 2(e, f) of the said drawings. In FIG. 3 (a=ZnS:Ag; b=Sr$_2$P$_2$O$_7$:Eu$^{2+}$; c=Sr$_6$CeGa(BO$_3$)$_6$) of the drawings accompanying this specification, the emission spectra of various compounds ($\lambda_{exc}$=355 nm) are given along with the borate phosphors of the present invention for comparison. When excited with radiation of wavelength 355 nm, these borate phosphors are found to give a broad band which peaks at 420 nm as shown in FIG. 3c of the drawings accompanying this specification for the composition I. Proper comparison is made with the standard commercial phosphors Sr$_5$(PO$_4$)$_3$Cl:Eu$^{2+}$, Sr$_2$P$_2$O$_7$:Eu$^{2+}$ (obtained from Nichia Co., Japan), Ca$_5$(PO$_4$)$_3$F:Sb, CaWO$_4$ and ZnS:Ag (home made) and our compounds are found to emit in the region as shown in FIG. 2 and FIG. 3 of the drawings accompanying this specification for various excitation wavelength.

The specific embodiment of present invention are further illustrated by the following examples which should not be construed to limit the scope of the invention.

EXAMPLE 1

Ingredients used in measures

SrCO$_3$=1.476 gm (0.01 mole)

H$_3$BO$_3$=0.618 gm (0.01 mole)

La$_2$O$_3$=0.269 gm (0.000825 mole)

Ga$_2$O$_3$=0.156 gm (0.000832 mole)

CeO$_2$=0.003 gm (0.0000174 mole)

Procedure used

Pre-firing temperature 300° C.; Duration: 10 hr.

Final heating temperature: 900° C.; Duration: 8 hr.

Firing atmosphere: reducing atm. created by burning activated charcoal

Results

Composition of the finally formed product: Sr$_6$La$_{0.99}$Ce$_{0.01}$Ga(BO$_3$)$_6$ Colour of the final product: White Density: 4.34 gm/cc (theor: 4.46 gm/cc)

Particle size: 3–28 $\mu$m

See also FIG. 1 & FIG. 2 of the drawings for luminescence properties.

EXAMPLE 2

Ingredients used in measures $SrCO_3$=1.476 gm (0.01 mole)

$H_3BO_3$=0.618 gm (0.01 mole)

$Ga_2O_3$=0.156 gm (0.000832 mole)

$CeO_2$=0.287 gm (0.001667 mole)

Procedure used

Pre-firing temperature: 300° C.; Duration: 10 hr.

Final heating temperature: 900° C.; Duration: 8 hr.

Firing atmosphere: reducing atm. created by $H_2$ gas flow

Results

Composition of the finally formed product: $Sr_6CeGa(BO_3)_6$

Colour of the final product: White weight of the final product: 1.76 gm (theor: 1.81 gm)

Particle size: 3–28 μm

See also FIG. 1, FIG. 2 & FIG. 3 of the drawings for luminescence properties.

EXAMPLE 3

Ingredients used in measures $SrCO_3$=1.230 gm (0.00833 mole)

$H_3BO_3$=0.618 gm (0.01 mole)

$Y_2O_3$=0.188 gm (0.00083 mole)

MgO=0.067 gm (0.00166 mole)

$CeO_2$=0.287 gm (0.00166 mole)

Procedure used

Final heating temperature: 1050° C.; Duration: 11 hr.

Firing atmosphere: reducing atm. created by burning activated charcoal

Results

Composition of the finally formed product: $CeSr_5YMg(BO_3)_6$

Colour of the final product: White

Density: 4.26 gm/cc (theor: 4.35 gm/cc)

Particle size: 2–28 μm

The Main Advantages of the Present Invention are:

1. The borate phosphors presently studied contain only $Ce^{3+}$ ion as the activator which substitutes for the ion present at the M site in the formula $Sr_6MM'(BO_3)_6$ (where M=La, Gd, Lu; M'=Ga) and at the La site in $LaSr_5YMg(BO_3)_6$.
2. The borate phosphors presently studied can be synthesized easily at lower temperatures than those required for the existing commercial blue phosphors.
3. These borate phosphors can be excited efficiently with radiation of wavelength 254 and 355 nm.
4. Both a high emission intensity (light output comparable to or greater than the commercial blue phosphors) as well as a high value of CRI can be possible with these borate phosphors.
5. These borate phosphors can be used (as a blue phosphor) in lpmv and superdeluxe lamps and (as a beam-index phosphor) in television tubes because of their efficient emission under various excitation wavelength (254 and 355 nm).

What is claimed is:

1. Novel blue emitting $Ce^{3+}$ activated borate phosphors having the formula $A_6M_{1-x}Ce_xM'(BO_3)_6$ wherein A=La,Sr; M=La, Y, Gd, Lu; and M'=Mg, Al, Ga, and x ranging from 0.001–1.

2. Novel blue emitting $Ce^{3+}$ activated borate phosphors as claimed in claim 1 wherein the particles sizes are in the range of 5–15 μm.

3. Novel blue emitting $Ce^{3+}$ activated borate phosphors as claimed in claim 1, said borate phosphors being synthesized from $SrCO_3$ 5.5–6.5 mole, $La_2O_3$ or $Gd_2O_3$ or $Lu_2O_3$ 0.0001–0.6 mole, MgO 0.85–1.1 mole, $Ga_2O_3$ 0.45–5.5 mole, $Y_2O_3$ 0.4–1.1 mole, $Al_2O_3$ or $Al(NO_3)_3.9H_2O$ 0.35–0.55 mole, $CeO_2$ 0.001–1.1 mole, and $H_3BO_3$ 5.5–7.0 mole.

4. A Process for the synthesis of novel blue emitting $Ce^{3+}$ activated borate phosphors having the formula $A_6M_{1-x}Ce_xM'(BO_3)_6$ wherein A=La,Sr; M=La, Y, Gd, Lu; and M'=Mg, Al, Ga, and x ranging from 0.001–1 and the said synthesis is carried out by the solid state reaction using at least four of the ingredients from the group consisting of $SrCO_3$ (5.5–6.5 mole), $La_2O_3$ or $Gd_2O_3$ or $Lu_2O_3$ (0.0001–0.6 mole), MgO (0.85–1.1 mole), $Ga_2O_3$ (0.45–5.5 mole), $Y_2O_3$ (0.4–1.1 mole), $Al_2O_3$ (0.35–0.55 mole) [or $Al(NO_3)_3.9H_2O$], $CeO_2$ (0.001–1.1 mole) and $H_3BO_3$ (5.5–7.0 mole), said process comprising the following steps: (i) mixing and grinding of the ingredients selected in suitable proportions, for about 15–45 minutes in an agate mortar with acetone, (ii) subjecting the ground ingredients to a pre-firing in air at temperatures ranging from 150–300° C. for a period of time ranging from 2–10 hr. and (iii) subjecting the pre-heated powders obtained from step(ii) to a final heat treatment under reducing atmosphere at temperatures ranging from 750–1050° C. for a period ranging from 6–30 hours, to obtain the desired phosphors useful as blue components in low pressure mercury vapour lamps, deluxe lamps and in television tubes, when excited with UV radiation of wavelengths 254 and 355 nm.

5. A process as claimed in claim 4 wherein the synthesis of the borate phosphors are carried out under reducing atmosphere created by either activated charcoal or $H_2$ gas flow.

6. A process as claimed in claim 4 wherein the synthesized borate phosphors have particle sizes in the range of 5–15 μm.

7. A process as claimed in claim 4 wherein the synthesized borate phosphors show intense blue emission in the region λ=400–420 nm.

8. A process as claimed in claim 4 wherein the synthesized borate phosphors are directly excited with radiation of wavelengths at 254 nm and 355 nm.

* * * * *

UNITED STATES PATENT AND TRADEMARK OFFICE
CERTIFICATE OF CORRECTION

PATENT NO. : 6,165,385  
DATED : December 26, 2000  
INVENTOR(S) : G. Rao et al.

Page 1 of 1

It is certified that error appears in the above-identified patent and that said Letters Patent is hereby corrected as shown below:

<u>Title page,</u>  
Item [57], ABSTRACT, line 6, "M = Mg," should be -- M' = Mg, --.

Signed and Sealed this

Twenty-fifth Day of December, 2001

Attest:

Attesting Officer

JAMES E. ROGAN  
*Director of the United States Patent and Trademark Office*